United States Patent

Rhelimi et al.

[11] Patent Number: 6,047,068
[45] Date of Patent: Apr. 4, 2000

[54] METHOD FOR DETERMINING AN ENCRYPTION KEY ASSOCIATED WITH AN INTEGRATED CIRCUIT

[75] Inventors: Alain Rhelimi, Cachan; Vincent Rigal, Sceaux; Rene Rosé, Nimes, all of France

[73] Assignee: Schlumberger Industries, Paris, France

[21] Appl. No.: 09/051,009

[22] PCT Filed: Sep. 18, 1996

[86] PCT No.: PCT/FR96/01446

§ 371 Date: Aug. 7, 1998

§ 102(e) Date: Aug. 7, 1998

[87] PCT Pub. No.: WO97/11442

PCT Pub. Date: Mar. 27, 1997

[30] Foreign Application Priority Data

Sep. 19, 1995 [FR] France .................................. 95 11078
Apr. 5, 1996 [FR] France .................................. 96 04436

[51] Int. Cl.[7] .................................................. H01L 49/00
[52] U.S. Cl. .................................. 380/46; 380/44; 380/47; 275/41; 429/8; 331/78

[58] Field of Search .................................. 380/44, 47, 46; 257/23, 41, 598, 600; 429/8; 331/78

[56] References Cited

U.S. PATENT DOCUMENTS

| | | | |
|---|---|---|---|
| 3,209,279 | 9/1965 | Kambouris | 331/78 |
| 3,519,952 | 7/1970 | Buegel | 331/78 |
| 3,675,148 | 7/1972 | Edwards | 331/78 |
| 4,243,950 | 1/1981 | Proud, Jr. | 331/78 |
| 4,272,731 | 6/1981 | Day et al. | 331/78 |
| 5,886,385 | 3/1999 | Arisumi et al. | 257/347 |

*Primary Examiner*—Tod R. Swann
*Assistant Examiner*—Paul E. Callahan
*Attorney, Agent, or Firm*—Frishauf, Holtz, Goodman, Langer & Chick, P.C.

[57] ABSTRACT

A method and an apparatus for determining an encryption key associated with an integrated circuit having a memory plane that includes a matrix of electric contacts on it's surface and a layer of inhomogeneous electric resistivity material disposed on the matrix. An encryption key is determined by the integrated circuit on the basis of the random distribution of the electrical resistances connecting the various electric contacts of the matrix.

23 Claims, 2 Drawing Sheets

METHOD FOR DETERMINING AN ENCRYPTION KEY ASSOCIATED WITH AN INTEGRATED CIRCUIT

FIELD OF THE INVENTION

The present invention concerns a method for determining an encryption key associated with an integrated circuit. It also concerns a rendered secure integrated circuit implementing said method.

BACKGROUND OF THE INVENTION

The invention can be applied advantageously for rendering smart cards secure, especially the smart cards used in encrypted television.

Generally speaking, smarts cards comprise a plastic card body and an electronic module inserted in a cavity fitted in said card body. The electronic module is made up of an integrated circuit or chip placed on a support provided with metallic zones for ensuring the electric link between the module and a card reader. The integrated circuit can be an EEPROM type memory for, for example, telecard applications or a microprocessor for bank card, mobile 'phone or even encrypted television applications.

Thus, most of the smart cards are used to carry out electronic transactions, which naturally implies that there is an attempt to defraud those systems using smart cards so as to be able to benefit from the services provided by these systems without paying for said services.

So as to avoid or, at least, limit the fraud, the information exchanged with the smart card electronic module are encrypted according to various well-documented methods. It merely suffices to be aware that the messages received by the integrated circuits of the cards are encrypted with keys known an encrypting keys and are stored in the non-volatile memory of the circuits. These keys can be protected against any external reading by masking the level of the memory plane in which they are recorded by several levels of metal serving as a screen whilst taking part in the dynamics of the circuit.

However, the degree of safety obtained is not absolute as it is always possible for an experienced defrauder to gain access to the secret keys via a functional analysis of the integrated circuit.

SUMMARY OF THE INVENTION

Also, the technical problem to be resolved by the object of the present invention concerns proposing a method for determining an encryption key associated with an integrated circuit having a memory plane, said method making it possible to reach a level for a much higher protection of the encryption keys owing in particular to a static storage of the keys outside the memory plane and therefore inaccessible by means of a functional analysis of the circuit.

According to the present invention, the solution to the technical problem consists of said method comprising the following stages:

(a) producing a matrix of N electric contacts $C_i$ (i=1) ..., N) on the surface of the memory plane, (b) placing on said matrix a layer of a random inhomogeneous electric resistivity material, (c) determining said encryption key, known as the resistive key Kr, on the basis of the random distribution of the electric resistances connecting the various electric contacts $C_i$ of the matrix.

Thus, the resistively random structure of said layer is used as a generator of the encryption key Kr associated with the integrated circuit. This key is therefore never stored in the memory plane of the circuit and, because of this, is restored on each occasion the integrated circuit is charged. Furthermore, it can be observed that the material layer forms a screen which protects the circuit against fraudulent readings. If this layer is removed or altered, the key is modified and the information shall stay encrypted permanently. It is possible to read by a device external to the integrated circuit the values of the resistances taken into account by the method of the invention so as to determine the encrypting key Kr.

One first improvement consists of providing the integrated circuit with an alarm mechanism. This makes it possible to detect attempts of fraud and take particular steps, such as the erasing of sensitive information.

According to the invention, to achieve this, the stage (c) further includes the determination on initialization of the integrated circuit of another resistive key KA, known as an alarm key, which is entered in a non-volatile memory of said circuit, and said second resistive key KA is measured on each charging of the integrated circuit and compared with the stored value of KA, the encryption key Kr being erased should a negative comparison occur. So as to provide operational reliability for this embodiment, several improvements can be made to it:

The key KA is measured from uncorrelated resistances with those used to determine the key Kr so that Kr can be deduced from KA.

The key KA is measured several times up to a maximum number, on each measurement of KA, information is entered in the non-volatile memory of the integrated circuit, for example updating of the number of tests still authorized, if any.

Rather than store the entire key KA, it is possible to merely store a condensed version (CRC, hashing) and carry out a conformity test.

The resistive key Kr is not measured if the measured value of KA does not conform as required.

A second improvement of the method of the invention consists in that the stage (c) further includes the determination on initialization of the integrated circuit of another resistive key KS, known as a stand-by key, which is entered in a non-volatile memory of said circuit, and in that a key KD is calculated from the resistive keys Kr and KS so that the encrypting key Kr can be calculated from the keys KS and KD, the key KD being entered in the non-volatile memory of the integrated circuit.

By way of example, said calculation means may be an 'or exclusive' and in this case results in:

KD=Kr+KS and

Kr=KD+KS

The integrated circuit can be provided with a mechanism making it possible to check the value Kr. In particular, it is possible to use a check-sum basis mechanism calculated by the integrated circuit and stored in its memory. It is essential that it is impossible to deduce the key Kr from this checksum. It is therefore preferable that the length of the checksum is extremely short with respect to that of the key Kr.

When starting the device, the chip concerned checks the key Kr. If the result is unsatisfactory, it looks for the stand-by key KS and is then able to re-establish Kr knowing KD. This constitutes a covering mechanism should there be a measurement or drift error of Kr.

At the moment when it detects that Kr is erroneous, the integrated circuit informs the outside world of this error. This allows for functioning in graceful degradation mode with KS whilst preparing for the replacement of the integrated circuit. It is also possible to time-limit the degradation mode, the circuit itself being disabled after a certain number of uses in degradation mode.

According to a particular embodiment of the invention, the integrated circuit possesses certain of its own information CI defining a list of resistances to be used for determining said resistive keys Kr, KA and KS. In this way, drive attack is also rendered inoperative as the defrauder would not be able to deduce the resistive key Kr of the card of the resistances.

According to one variant of this latter embodiment, the measuring means only measure the useful resistances whose list depends on the information CI.

According to another embodiment of the invention, the list of resistances to be used is established by the integrated circuit at the time of initialization according to the resistances measured. Said list is entered in a non-volatile memory of the circuit and completes the information CI or takes the place of it. Of course, after initialization of the integrated circuit, any entering of lists in said non-volatile memory is inhibited, for example by a physical or logic fuse.

According to a first application example, said list comprises resistances with sufficiently remote values. This ensures that a minor change of the resistance values does not modify the resistive key Kr.

According to a second application example, said list comprises resistances with values of the same order of magnitude. This prevents a defrauder from measuring the resistances of the layer by surface probes and then be able to deduce from this the resistive key Kr.

Finally, said list also comprises resistances with values contained inside a given range so as to cumulate the two preceding examples.

So as to further improve the degree of safety offered by the method of the invention, following stage (B) is a stage consisting of placing a metallic screen on said material layer with random inhomogeneous electric resistivity.

According to one particular mode for implementing the method of the invention, said material with random inhomogeneous electric resistivity is embodied by mixing a low electric resistivity ink with a high electric resistivity ink.

Finally, according to the present invention, an integrated circuit rendered secure having a memory plane is notable in that it comprises a matrix of N electric contacts Ci (i=1, . . . , N) on the surface of said memory plane, a layer of a random electric inhomogeneous resistivity placed on said matrix and means for determining an encryption key Kr known as a resistive key on the basis of the random distribution of the electric resistances connecting the various electric contacts Ci of the matrix.

BRIEF DESCRIPTION OF THE DRAWINGS

The following description, relating to the accompanying drawings given by way of non-restrictive examples, show details to gain a fuller understanding of the invention and how it can be embodied.

DETAILED DESCRIPTION OF THE PREFERRED EMBODIMENTS

Figure 1:
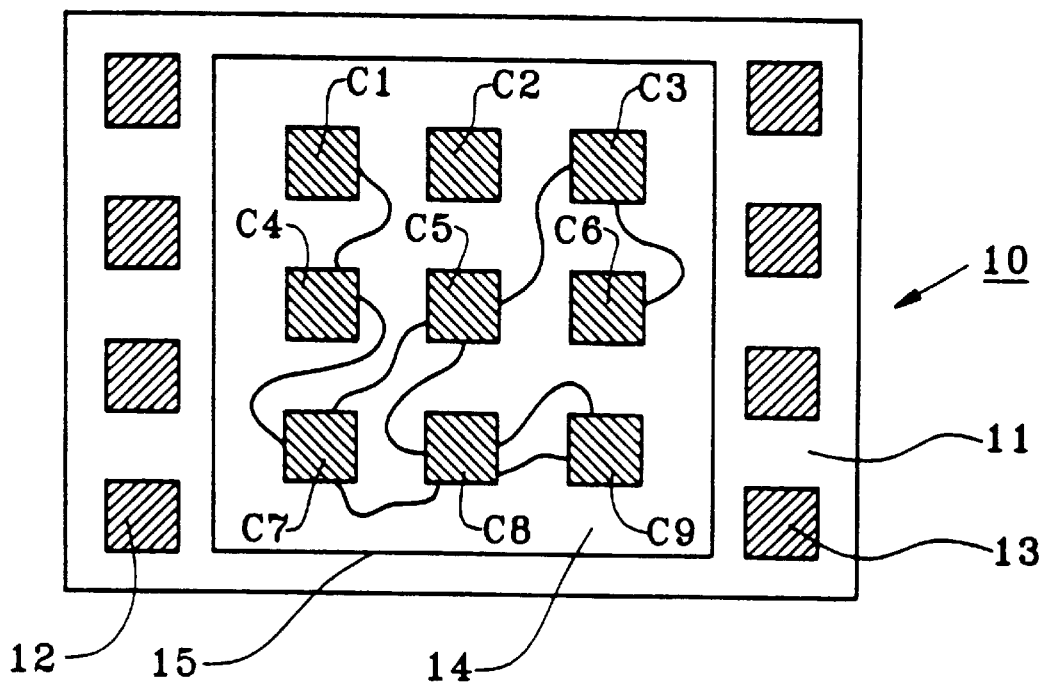
FIG. 1 is a side view of an integrated circuit rendered secure by implementing the method of the invention.
Figure 2:
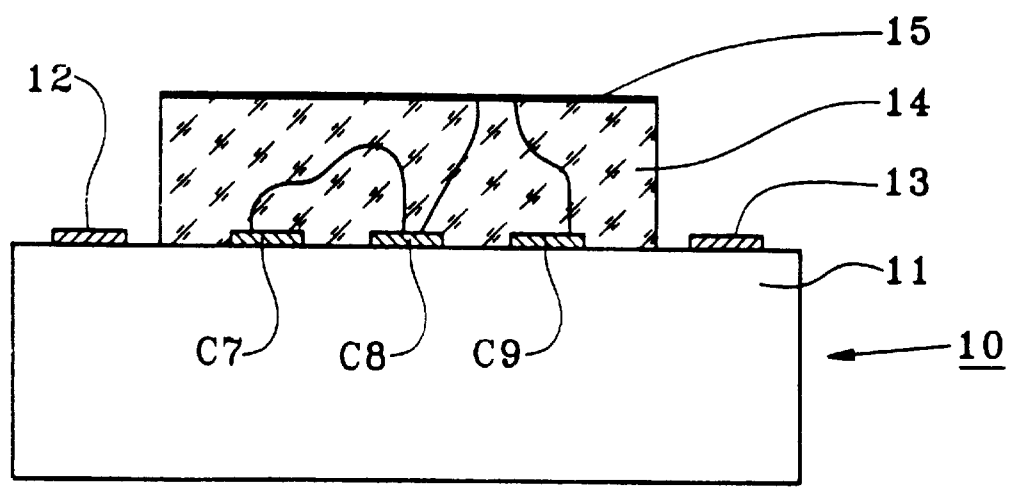
FIG. 2 is a top view of the integrated circuit of FIG. 1.

The integrated circuit 10 shown on FIGS. 1 and 2 has a memory plane 11, or active face, on which metallic input/output hubs 12 and 13 are formed and intended to be connected by conductive wires to the metallic areas of a support (not shown) which, along with the integrated circuit 10, constitutes the electronic module of a smart card.

As can be seen on FIGS. 1 and 2, a matrix of 9 electric contacts (i=1, . . . 9) has been embodied on the surface of the memory plane 11 of the circuit 10. This matrix of electric contacts is covered by means of screen printing, for example, with a layer 14 of a random inhomogeneous electric resistivity material 14, such as a mixture of a low electric resistivity ink and a high electric resistivity ink. The material layer 14 may have a thickness of about a maximum of 10 $\mu$m.

As shown on FIGS. 1 and 2, the conventional paths between the various electric contacts Ci of the matrix may assume extremely varied shapes resulting from the random structure of the electric resistivity inside the layer 14. It is this random distribution of the electric resistances between the contacts Ci which constitutes the basis of the method for determining an encryption key Kr, known as a resistive key, associated with the integrated circuit 10, said key being, as it were, a digitalized expression of the distribution of the resistances, as shall be explained later in more detail.

Note that, because the encryption key Kr of the circuit is finally contained inside the material layer 14, it is advantageous to protect said layer by covering it with a metallic screen 15 which moreover can take part in establishing the conventional paths indicated on FIG. 2.

In the same way as with the layer 14, the metallic screen 15 may have a thickness of 10 $\mu$m (in this respect, the drawing of FIG. 2 has not been shown to scale).

Figure 3:
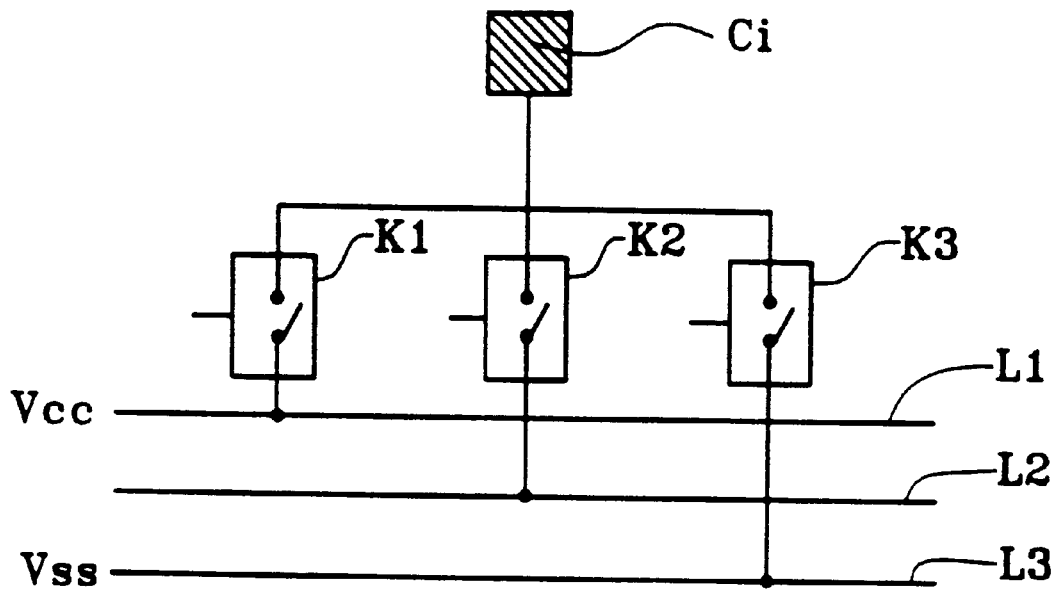
FIG. 3 is a diagram of the means for determining an encryption key associated with the integrated circuit of FIGS. 1 and 2.

FIG. 3 shows a diagram of the means used to determine the encryption key Kr applied to the circuit structure of FIGS. 1 and 2.

These determination means comprise a bus including a line $L_1$ with a first voltage $V_{cc}$, a measuring line $L_2$ and a line $L_3$ with a second voltage $V_{ss}$. Each line $L_1$, $L_2$, $L_3$ of the bus can be connected to an electric contact of the matrix by means of three controllable analog switches $K_1$, $K_2$ and $K_3$ respectively. In other words, each contact Ci can be connected solely to one of the lines $L_1$, $L_2$, $L_3$ of the bus.

Figure 4:
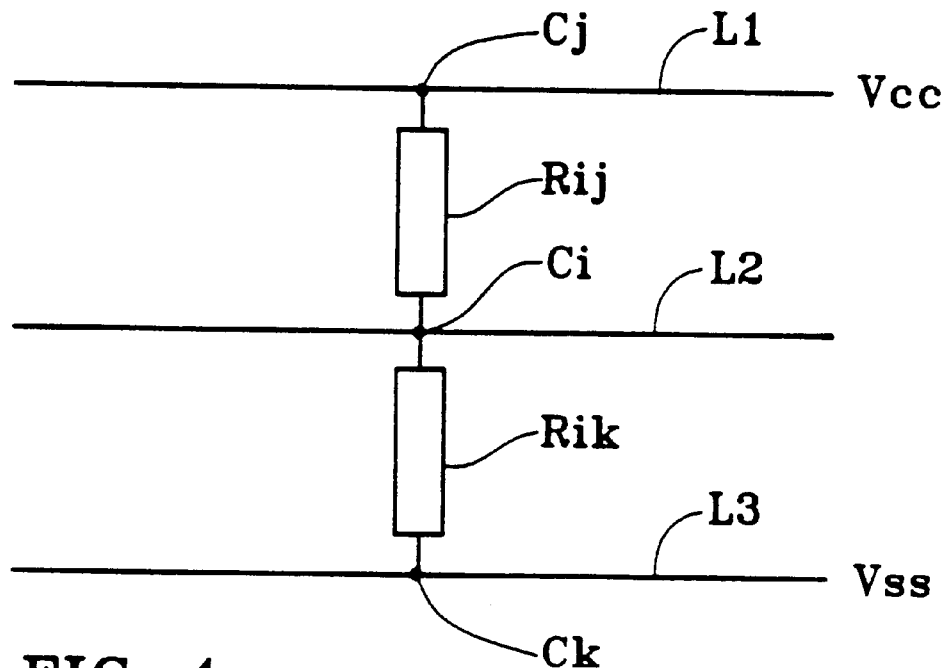
FIG. 4 is an equivalent diagram of the determination means of FIG. 3.

The integrated circuit 10 controls the analog switches $K_1$, $K_2$ and $K_3$ so as to define a set of M (1=1, . . . , M) triplets of electric contacts (Cj, Ci, Ck), the contacts Cj, Ci and Ck being respectively connected to the lines $L_1$, $L_2$ and $L_3$ of the bus. Thus, the equivalent circuit of FIG. 4 is obtained and in which Rij and Rik represent the electric resistances connecting the contact Ci to the contacts Cj and Ck respectively. The choice of the contacts Cj, Ci, Ck is determined either from the information CI of the circuit 10, or from a list written in the non-volatile memory of the circuit.

So as to be able to carry out a significant comparison of the resistances Rij and Rik, it is advantageous for each triplet (Cj, Ci, Ck)1 that the contacts Cj and Ck be equidistant from the contact Ci. In this case, the resistances Rij and Rik, although equivalent, are generally different owing to the fact of the random inhomogeneity of the electric resistivity of the material layer 14. This difference is then used to allocate to each triplet (Cj, Ci, Ck)1 a bit b1 conventionally defined by:

$b_1=1$ if Rij>Rik $b_1=0$ if Rij<Rik

Thus, one has a random set of M bits $b_1$ which, arranged according to an ordered sequence, determine the encryption key Kr to be allocated to the integrated circuit 10.

In practice, the voltage of the measuring line L2 is compared with $(V_{cc}+V_{ss})/2$, the sign of this comparison making it possible to establish the logic information $b_1$. This relative resistance measuring technique has the advantage of being freed of temperature and voltage variations.

It is also important to note that the additional measuring resistances need to be extremely small so as to avoid reducing the influence of the dispersion of the inhomogeneous resistances to be measured. In fact, the measuring channels are themselves dispersions which, if they were to become too large, would render inadequate the influence and modification of the material layer 14, which would open up the possibility of a fraud being committed.

In the example of the 3×3 matrix of FIGS. 1 and 2, the triplets satisfying the equidistance condition are:

($C_1$, $C_2$, $C_3$) 1 (C4, C5, C6)2, (C7, C8, C9)3

(C4, C1, C2)4, (C2, C3, C6)5, (C8,C9,C6)6, (C4, C7, C8)7

(C1, C4, C7)8, (C2, C5, C8)9, (C3, C6, C9)10

(C1, C5, C9)11, (C7, C5, C3)12

(C1, C7, C9)13, (C1, C3, C9)14

(C2, C7, C9)15, (C1, C8, C3)16

(C2, C4, C8)17 (C2, C6, C8)18

Thus, 18 bits $b_1$ are obtained each associated with one of the 18 triplets and hence and 18 bit encryption key.

If required, the key Kr can be corrected by an error correction code stored in the memory on customization of the card. However this code does not make it possible to refind the key if there is no initial key.

The other resistive keys, namely the alarm key KA and the stand-by key KS are determined in the same way, the choice of the contacts Cj, Ci, Ck being different.

What is claimed is:

1. Method for determining an encryption key associated with an integrated circuit having a memory plane, wherein said method comprises the following stages:
   (a) embodying a matrix of N electric contacts $C_i$ on the surface of the memory plane,
   (b) placing on said matrix a layer of a random inhomogeneous electric resistivity material,
   (c) determining said encryption key, known as the resistive key Kr, on the basis of the random distribution of the electric resistances connecting the various electric contacts $C_i$ of the matrix.

2. Method according to claim 1, wherein the stage (c) further includes the determination on initialization of the integrated circuit of another resistive key KA, known as a stand-by key, which is written in a non-volatile memory of said circuit, and wherein said second resistive stand-by key KA is measured on each switching on of the integrated circuit and compared with the stored value of KA, the encryption key Kr being erased should a negative comparison occur.

3. Method according to claim 2, wherein the stage (c) further includes the determination on initialization of the integrated circuit of another resistive key KS, known as a stand-by key, which is written in a non-volatile memory of said circuit, and wherein a key KD is calculated from the resistive keys Kr and KS so that the encryption key Kr can be calculated from the keys KS and KD, the key KD being written into the non-volatile memory of the integrated circuit.

4. Method according to claim 1, wherein the integrated circuit possess its own information CI defining the list of the resistances to be used to determine said resistive keys.

5. Method according to claim 1, wherein the list of the resistances to be used is established by the integrated circuit at the time of initialization according to the measured resistances.

6. Method according to claim 5, wherein said list is written into a non-volatile memory of the integrated circuit.

7. Method according to claim 6, wherein, after initialization of the integrated circuit, any entering of lists in said non-volatile memory is inhibited.

8. Method according to claim 5, wherein said list comprises resistances with values sufficiently distant from one another.

9. Method according to claim 5, wherein said list comprises resistances with values of the same order of magnitude.

10. Method according to claim 5, wherein said list comprises resistances with values contained within a given range.

11. Method according to claim 2, wherein the stage (c) for determining said resistive keys, after having defined a set of M triplets of electric contacts, consists of:
    allocating to each triplet a bit $b_1$ conventionally defined by:
    $b_1=1$ if Rij>Rik
    $b_1=0$ if Rij<Rik
    Rij and Rik being the electric resistances connecting the contact Ci to the contacts Cj and Ck respectively;
    construct the resistive key in the form of an ordered sequence of M bits $b_1$.

12. Method according to claim 11, wherein for each triplet the contacts Cj and Ck are equidistant from the contact Ci.

13. Method according to claim 1, wherein following stage (b) it comprises a stage consisting of placing a metallic screen on said material random inhomogeneous electric resistivity layer.

14. Method according to claim 1, wherein said random inhomogeneous electric resistivity layer is embodied by mixing an ink with low electric resistivity with an ink with high electric resistivity.

15. Secure integrated circuit and having a memory plane, wherein it comprises a matrix of N electric contacts Ci on the surface of said memory plane, a layer of a random inhomogeneous electric resistivity material placed on said matrix, and means for determining an encryption key on the basis of the random distribution of the electric resistances connecting the various electric contacts Ci of the matrix.

16. Secure integrated circuit according to claim 15, wherein said determination means are suitable for determining on initialization of said circuit an encryption key Kr known as a resistive key.

17. Secure integrated circuit and having a memory plane, wherein it comprises a matrix of N electric contacts Ci on the surface of said memory plane, a layer of a random inhomogeneous electric resistivity material placed on said matrix, and means for determining an encryption key on the basis of the random distribution of the electric resistances connecting the various electric contacts Ci of the matrix,
    wherein said determination means are suitable for determining on initialization of said circuit an encryption key Kr known as a resistive key, and
    wherein said determination means are also suitable for determining on initialization of said circuit another resistive key Ka known as an alarm key so as to implement the method according to claim 2.

18. Secure integrated circuit and having a memory plane, wherein it comprises a matrix of N electric contacts Ci on the surface of said memory plane, a layer of a random inhomogeneous electric resistivity material placed on said matrix, and means for determining an encryption key on the basis of the random distribution of the electric resistances connecting the various electric contacts Ci of the matrix, wherein said determination means are suitable for determining on initialization of said circuit an encryption key Kr known as a resistive key, and wherein said determination means are also able to determine on initialization of the circuit another resistive key Ks known as a stand-by key for implementing the method according to claim 3.

19. Secure integrated circuit according to claim 15, wherein said means for determining said resistive keys, after having defined a set of M triplets of electric contacts, are able to:

allocate to each triplet a bit $b_1$ conventionally defined by:
   $b_1=1$ if Rij>Rik
   $b_1=0$ if Rij<Rik Rij and Rik being the electric resistances connecting the contact Ci to the contacts Cj and Ck respectively, construct the resistive key in the form of an ordered sequence of M bits $b_1$.

20. Secure integrated circuit according to claim 19, wherein for each triplet, the contacts Cj and Ck are equidistant from the contact Ci.

21. Secure integrated circuit according to claim 19, wherein said means for determining the resistive keys firstly comprise a bus including a line to with a first voltage Vcc, a measuring line and a line with a third voltage Vss, and secondly three controllable analog switches for connecting each contact Ci to one of the lines.

22. Secure integrated circuit according to claim 15, wherein said random inhomogeneous electric resistivity material layer is covered with a metallic screen.

23. Secure integrated circuit according to claim 15, wherein said random inhomogeneous electric resistivity material is a mixture of an ink with high electric resistivity and an ink with low electric resistivity.

* * * * *